United States Patent
Chun et al.

(10) Patent No.: US 7,257,757 B2
(45) Date of Patent: Aug. 14, 2007

(54) FLEXIBLE ACCELERATORS FOR PHYSICAL LAYER PROCESSING

(75) Inventors: Anthony L. Chun, Los Altos, CA (US); Ernest T. Tsui, Cupertino, CA (US); Walter L. Snyder, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 10/813,597

(22) Filed: Mar. 31, 2004

(65) Prior Publication Data
US 2005/0223304 A1    Oct. 6, 2005

(51) Int. Cl.
*H03M 13/03* (2006.01)
*H04L 1/00* (2006.01)
*H04L 5/00* (2006.01)

(52) U.S. Cl. .................. 714/746; 370/465; 375/316
(58) Field of Classification Search ............... 714/746; 370/465; 375/316
See application file for complete search history.

(56) References Cited

U.S. PATENT DOCUMENTS

| | | | |
|---|---|---|---|
| 5,671,253 A | | 9/1997 | Stewart |
| 6,456,611 B1* | | 9/2002 | Hu et al. .................. 370/342 |
| 6,807,227 B2* | | 10/2004 | Chien ...................... 375/224 |
| 6,990,598 B2* | | 1/2006 | Sherburne, Jr. ........... 713/600 |
| 7,016,654 B1* | | 3/2006 | Bugeja .................... 455/73 |
| 2002/0070796 A1* | | 6/2002 | Gay-Bellile et al. ....... 329/304 |
| 2004/0034703 A1 | | 2/2004 | Phadke |
| 2005/0138323 A1 | | 6/2005 | Snyder |
| 2005/0219251 A1 | | 10/2005 | Chun et al. |
| 2005/0223110 A1 | | 10/2005 | Honary et al. |
| 2005/0223369 A1 | | 10/2005 | Chun et al. |
| 2005/0223380 A1 | | 10/2005 | Chun et al. |
| 2005/0229140 A1 | | 10/2005 | Tsai et al. |

FOREIGN PATENT DOCUMENTS

EP    1 126 621 A    8/2001

OTHER PUBLICATIONS

Wu, W., et al., "A Coarse-Grained FPGA Architecture for Reconfigurable Baseband Modulator/Demodulator", Proc. 36$^{th}$ Asilomar Conf. on Signals, Systems and Computers, Nov. 2002, pp. 1613-1618.*
Salcic, et al., "Software Radio—Architectural Requirements, Research and Development Challenges", ICCS 2002, Nov. 2002, pp. 711-716.*
Tuttlebee, W., et al., "Software Radio Technology: A European Perspective", IEE Communications Magazine, Feb. 1999, pp. 118-123.*
Polydoros, A., et al., "WIND-FLEX: Developing a Novel Testbed for Exploring Flexible Radio Concepts in an Indoor Environment", IEEE Communications Magazine, Jul. 2003, pp. 116-122.*

(Continued)

*Primary Examiner*—Stephen M. Baker
(74) *Attorney, Agent, or Firm*—Blakely, Sokoloff, Taylor & Zafman LLP

(57) ABSTRACT

Flexible, micro-coded accelerators are applied to perform physical layer processing in communications applications. The accelerators are reconfigurable and may be programmed to incorporate new protocols as they are introduced.

27 Claims, 7 Drawing Sheets

OTHER PUBLICATIONS

McCloskey, J., "Application of VHDL to Sotfware Radio Technology", 1998 IVC/VIUF Mar. 1998, pp. 90-95.*

Palicot, J., et al., "FFT: A Basic Function for a Reconfigurable Receiver", 2003 MCOM, Jul. 2003, pp. 124-132.*

Xiao, Z., et al., "A State-Machine Based Design of Adaptive Wireless MAC Layer", 2003 VTC, Apr. 2003, pp. 2837-2841.*

PCT/ISR/WO; PCT/US2005/010176; Sep. 6, 2005 (15 pgs).

Pending U.S. Appl. No. 11/122,071, filed May 5, 2005, Inventor: Jian Lin.

Pending U.S. Appl. No. 10/881,334, filed Jun. 30, 2004, Inventor: Ernest Tsui.

* cited by examiner

FLEXIBLE ACCELERATORS FOR PHYSICAL LAYER PROCESSING

BACKGROUND OF THE INVENTION

Communications devices are being developed and introduced into an evolving communications landscape that includes an increasing number of network protocols. It is often desirable and necessary for the devices to support multiple protocols. To support existing and new protocols, devices may require some reconfigurable logic, particularly at the physical (PHY) layer. Most reconfigurable logic components, however, are not viable for the current demands being placed on communication devices.

PHY layer processing encompasses such computationally intensive operations as filtering, resampling, fast-Fourier transforming (FFT), channel estimation, despreading and error correction decoding. Traditionally, PHY layer processing is performed using general purpose processors or digital signal processors (DSP) or application specific integrated circuits (ASIC). General purpose processors and DSPs are inherently programmed for a variety of PHY processing tasks; however, as data rates of network protocols have increased, it has become difficult for these types of processors to meet speed requirements while maintaining power consumption goals. ASICs are also used to implement PHY layer requirements and maintain power consumption goals. ASICs, however, are not easily reconfigured for processing additional protocols.

BRIEF DESCRIPTION OF THE DRAWINGS

The invention shall be described with reference to the accompanying figures, wherein.

Figure 1:
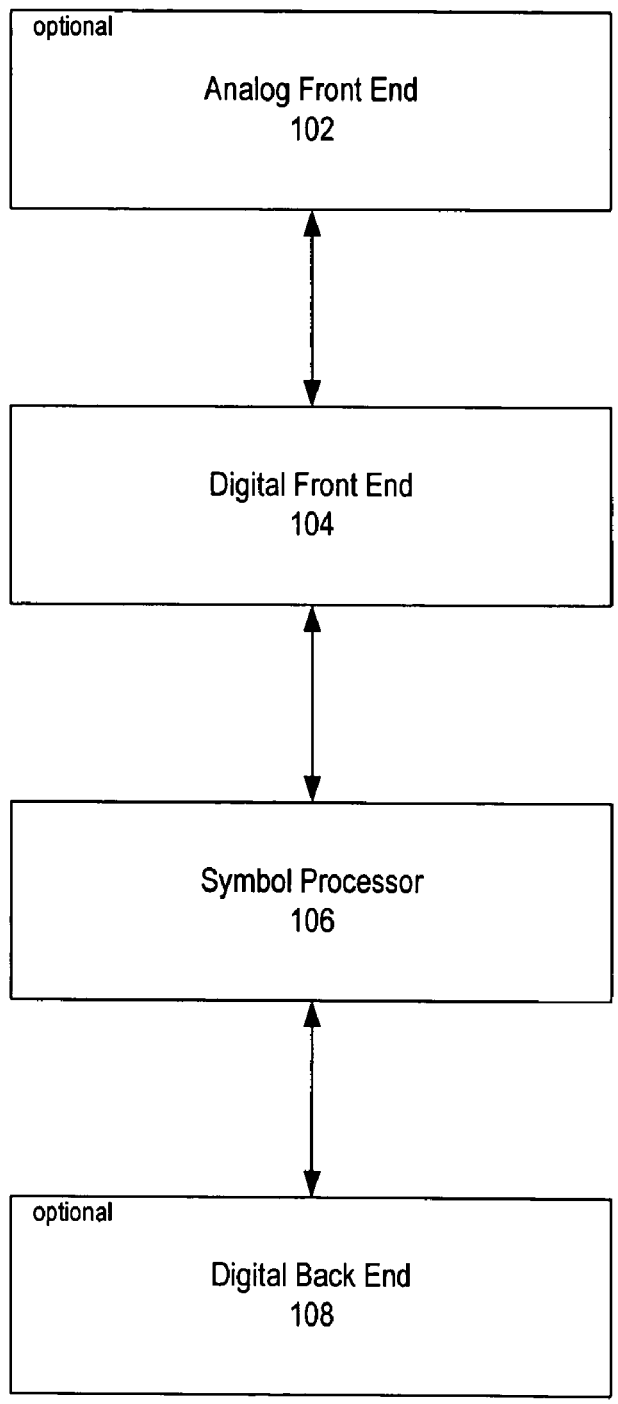
FIG. 1 illustrates a diagram of a PHY layer processing system, according to an embodiment of the present invention.

The invention is now described with reference to the accompanying drawings. In the drawings, like reference numbers generally indicate identical, functionally similar, and/or structurally similar elements. The drawing in which an element first appears is generally indicated by the left-most digit(s) in the corresponding reference number.

DETAILED DESCRIPTION OF PREFERRED EMBODIMENTS

While the present invention may be described in terms of the embodiments provided herein, this is exemplary and is not intended to limit its application. In fact, after reading the following description, it will be apparent to one of ordinary skill in the art(s) how to implement the following invention in alternative embodiments (e.g., in various communications devices and operating the MCA enabled processing elements with various protocols, etc.).

Furthermore, while the following description focuses on PHY layer processing, it is not intended to limit the application of the present invention to the current scope of PHY layer processing. It will be apparent to one skilled in the relevant art(s) how to implement the following invention, where appropriate, in alternative embodiments. For example, the present invention may be applied, alone or in combination, in various MCA architectures, to interact more broadly with one or more devices at the PHY layer.

In this detailed description, numerous specific details are set forth. However, it should be understood that embodiments of the invention may be practiced without these specific details. In other instances, well-known circuits, structures, and/or techniques have not been shown in full detail to aid an understanding of the present invention.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In this detailed description and claims, the term "coupled," along with its derivatives, such as, "connected" and "electrically connected", may be used. It should be understood that "coupled" may mean that two or more elements are in direct physical or electrical contact with each other or that the two or more elements are not in direct contact but still cooperate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A "processing element" may comprise one or more circuits designed to perform various tasks, but may not include a processor. As such, a processing element may include various general purpose processors, digital signal processors, or application specific intergrated circuits (ASIC). In the embodiments of the present invention, one or more flexible, reprogrammable, micro-coded accelerators may be implemented as processing elements.

Embodiments of the present invention may include circuits and apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include a computer-readable medium that includes: read only memory (ROM); random access memory (RAM); magnetic disk storage media; optical storage media; flash memory devices. The machine-readable medium may also include a communication medium that includes electrical, optical, acoustical or other form of propagated signals (e.g., carrier waves, infrared signals, digital signals, etc.), and others.

The present invention may provide PHY layer processing using a limited set of MCAs. In embodiments, PHY layer processing may include computationally intensive operations, such as, but not limited to, filtering, resampling, FFT, channel estimation, despreading, and error correction decoding. Each MCA may perform a limited range of functions. Each MCA may be reconfigured for different or future protocols. In embodiments, each MCA may be implemented as a fixed-function ASIC with additional control and configuration logic.

With respect to FIG. 1, a diagram of a PHY layer processing system 100, according to an embodiment of the present invention is illustrated. System 100 may be structured in a heterogeneous architecture in which each component may be architected to perform a certain class of operations. The system 100 may include an optional analog front end 102 coupled to a digital front end 104. In one embodiment of the present invention, a filter MCA (described in further detail below) performs the functions of the digital front end 104. In one embodiment of the present invention, the functions of the digital front end 104 include, but are not limited to, filtering, fast Fourier transforms, and fast Walsh transforms.

Additional transformation types may be employed, as one of ordinary skill in the art would recognize, based at least on the teachings provided herein, such as, but not limited to, discrete Fourier transforms and fast wavelet transforms.

The digital front end 104 may be coupled to symbol processor 106. In one embodiment, the symbol processor 106 may be a general-purpose MCA (described in detail below). In embodiments, the symbol processor 106 may perform functions such as, but not limited to, synchronization and line discipline processing, logic functions, bit processing, and PHY control operations.

The symbol processor 106 may be coupled to an optional digital back end 108. In one embodiment, the digital back end 108 may be a Viturbo MCA (described in detail below). According to embodiments, the digital back end 108 may perform forward error correction and one or more types of decoding functions.

Figure 2A:
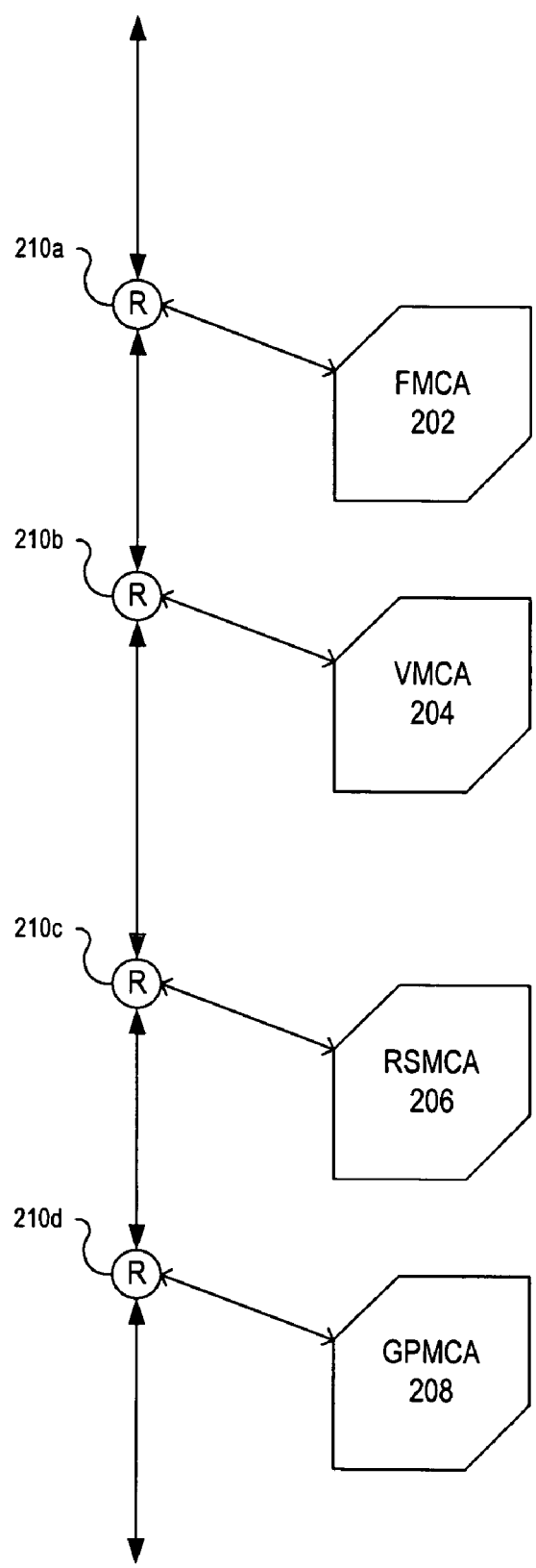
FIG. 2A illustrates a diagram of a PHY layer processing system showing processing elements, which may include one or more micro-coded accelerators (MCA) networked with routers, according to an embodiment of the present invention.

With respect to FIG. 2A, a diagram of a PHY layer processing system showing micro-coded accelerators (MCA) networked with routers, according to an embodiment of the present invention, is illustrated. As mentioned above, the MCAs may be employed in PHY layer processing, according to embodiments of the present invention. A filter MCA (FMCA) 202 may be coupled to a router 210a and may receive one or more signals via the connectivity provided by the router 210a. In addition, one or more routers 210b-d are further coupled to one another, and thus provide connectivity to the additional MCAs, according to embodiments of the present invention. As one of ordinary skill in the relevant art would recognize based at least on the teachings provided herein.

The FMCA 202 may be configured to perform a variety of digital signal processing functions. The functions may be, but are not limited to, digital filtering, adaptive equalization, resampling, despreading, and FFT. An embodiment of the FMCA 202 is described in further detail below with respect to FIG. 3.

A Viterbi-Turbo MCA (VMCA) 204 may be coupled to the router 210b, and thus may receive the one or more signals, as well as other signals, data, symbols, or other processed information from the FMCA 202. According to embodiments, the VMCA 204 may perform forward error correction decoding using Viterbi decoding for convolutional codes and turbo decoding for parallel concatenated "turbo" codes.

According to embodiments of the present invention, the MCAs may perform turbo encoding, Trellis encoding, and as described below, Reed-Solomon FEC encoding, as one skilled in the relevant art(s) would recognized based at least on the teachings herein.

A Reed-Solomon MCA (RSMCA) 206 may be coupled to the router 210c, and thus may receive the one or more signals, as well as other signals, data, symbols, or other processed information from the FMCA 202 and/or VMCA 204. According to embodiments, the RSMCA 206 may perform decoding or encoding of Reed-Solomon block codes.

A general-purpose MCA (GPMCA) 208 may be coupled to the router 210d, and thus may receive the one or more signals, as well as other signals, data, symbols, or other processed information from the MCAs 202-206. According to embodiments, the GPMCA 208 may perform a variety of bit and symbol-oriented functions such as, but not limited to, deinterleaving and descrambling.

As described elsewhere herein, each of the MCAs 202-208 may be targeted at a specific class of processing, and may be programmed (configured) and reprogrammed (reconfigured) within its defined set of operations.

In an alternative embodiment of the present invention, a micro-coded accelerator based physical layer processing circuit may include a filter processing element to process a signal, at least one decoding processing element to decode and correct errors in the signal, and a general purpose processing element to process the signal. Each processing element may include one or more MCAs.

In addition, according to embodiments of the present invention, a communications interface may be employed to couple the processing elements to the network. Supplemental processing elements maybe coupled to the network, and may be configured to transmit the signal on a communications path. In one or more embodiments, the supplemental processing elements may receive the signal after processing by the physical layer processing elements. In some embodiments, the communications interface may include at least one data router adapter.

According to embodiments of the present invention, one or more control units may direct the operations of the processing elements according to a first set of protocols. Furthermore, the processing elements may be coupled in a network, which may include one or more routers.

In embodiments of the present invention, each of the decoding processing elements may perform at least one of the following operations: forward error correction, Reed-Solomon forward error correction, turbo decoding, Trellis decoding, or Viterbi decoding.

According to embodiments of the present invention, the processing elements, within each of the one or more MCAs, may include one or more control units capable of reconfiguring the processing elements to operate according to one or more sets of protocols, including new protocols as they become available. In embodiments of the present invention, these sets of protocols may include parameters for operation within at least one of a wired or wireless, local or wide-area network, or an optical network.

Figure 2B:
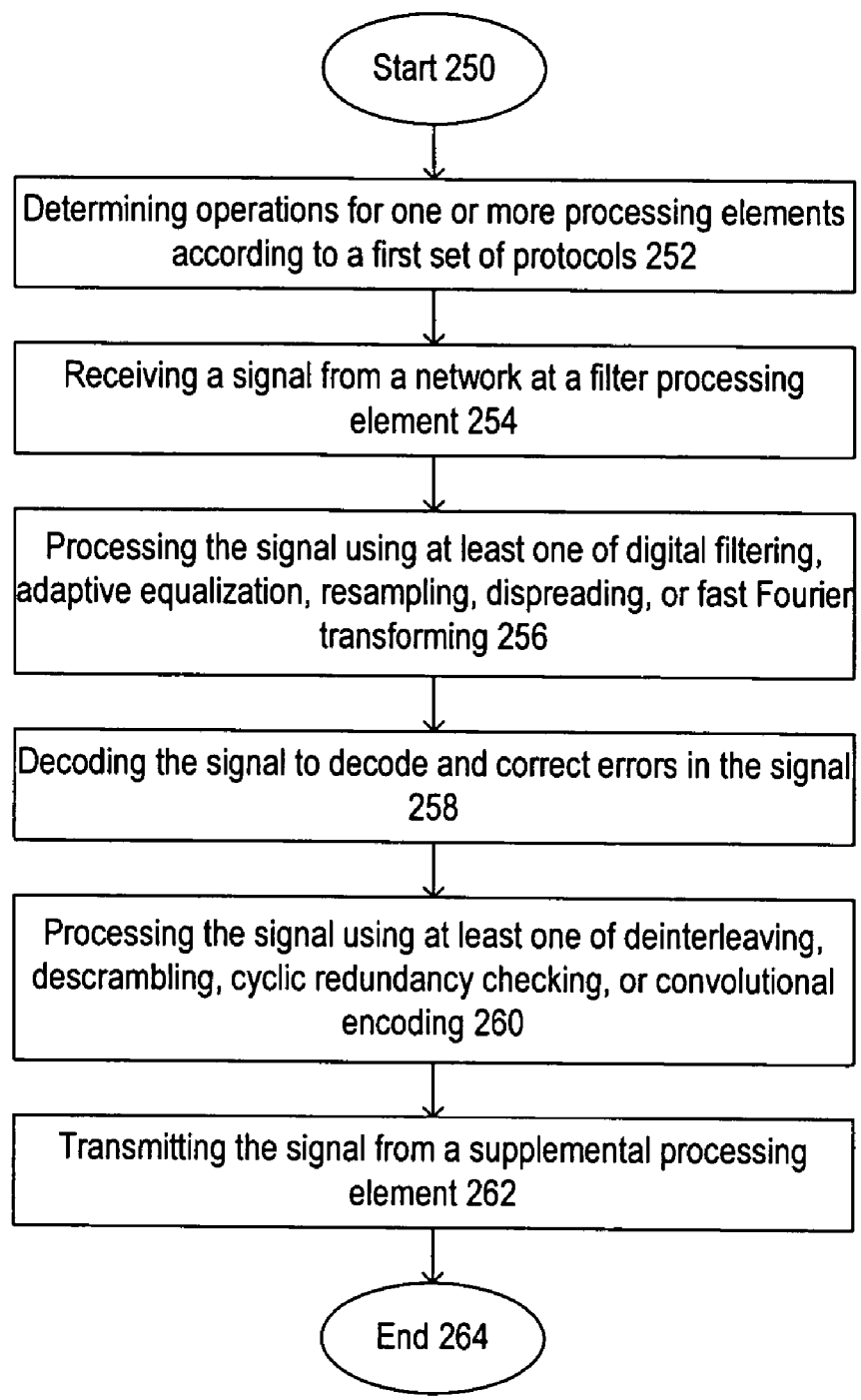
FIG. 2B shows a flow chart of the operations of a PHY layer processing system, according to an embodiment of the present invention.

With respect to FIG. 2B, a flowchart of a micro-coded accelerator based method for physical layer processing is shown. According to embodiments of the present invention, the method may include at least the operations illustrated which begin at block 250 and proceed immediately to block 252.

At block 252, according to embodiments of the present invention, the system may include one or more control units (CU), such as, but not limited to those described with regard to system 200, to determine operations of one or more processing elements according to a first set of protocols. The process then proceeds to block 254.

At block 254, a filter processing element may receive a signal from the network. The filter processing element may then process the signal at the filter processing element using at least one filtering process selected from a group comprised of digital filtering, adaptive equalization, resampling, despreading, and fast-Fourier transforming, illustrated at block 256. The process then proceeds to block 258.

At block 258, at least one decoding processing element may decode the signal to decode and correct errors in the signal. According to embodiments of the present invention, each of the at least one decoding processing elements may perform decoding operations selected from the group comprised of forward error correction, Reed-Solomon forward error correction, turbo decoding, Trellis decoding, and Viterbi decoding. The process then proceeds to block 260.

At block 260, a general purpose processing element may process the signal using at least one process from a group comprised of deinterleaving, descrambling, cyclic redundancy checking, convolutional encoding, Reed-Solomon encoding, turbo encoding, and Trellis encoding. The process then proceeds to block 262.

At block 262, a supplemental processing element, in receipt of the processed signal, may transmit the signal. In one embodiment of the present invention, a communications interface, which in one embodiment of the present invention, may be at least one data router adapter, may couple the processing elements to the network.

According to one embodiment, each MCA may be implemented as a fixed-function ASIC with the additional reconfigurability provided by the control and configuration logic of each MCA, which is described in detail below with respect to FIGS. 3-5.

Figure 3:
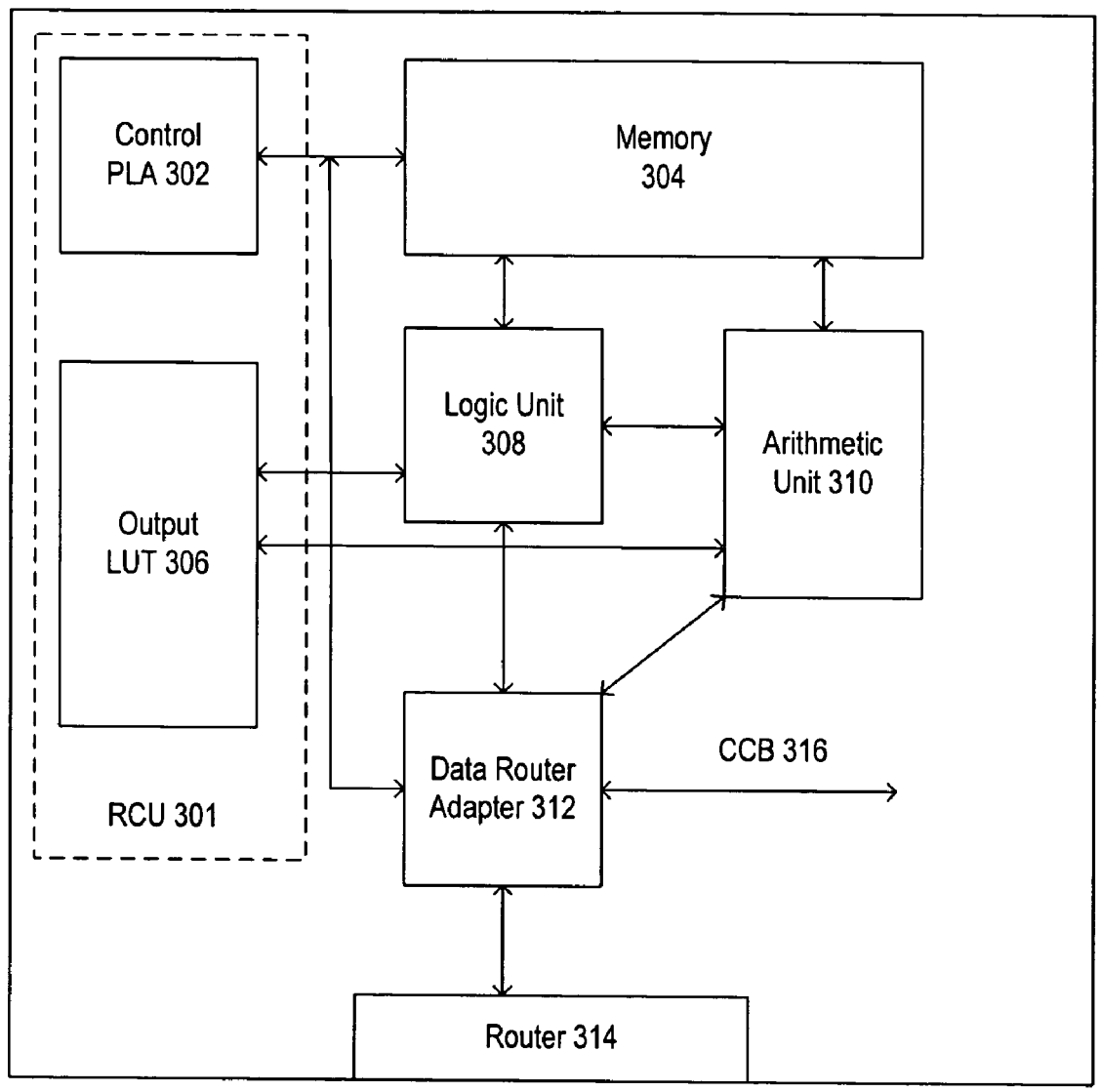
FIG. 3 illustrates a diagram of a filter processing element, according to embodiments of the present invention.

With respect to FIG. 3, a diagram of a filter processing element, such as a filter MCA (FMCA) 300, according to embodiments of the present invention, is illustrated. According to the embodiment shown, the FMCA 300 may include a reconfigurable control unit 301, which may include a control programmable logic array (PLA) 302, and an output look-up table 308. The control PLA 302 may provide trigger queues and generate control signals for the FMCA 300. The control PLA 302 may be coupled to the other components of the FMCA 300, and thus able to communicate with one or more of a memory 304, an output lookup table (LUT) 306, a logic unit (LU) 308, an arithmetic unit (AU or arithmetic logic unit (ALU)) 310, and a data router adapter (DRA) 312. The DRA 312 may be coupled to a router 314, either internal or external to the FMCA 300.

The one or more memory 304 may store control and routing information. In some embodiments of the present invention, the memory 304 may be configured with multiple ports for different functions, such as, but not limited to, storing and retrieving data and coefficient information. The output LUT 306 may receive operation numbers from the control PLA 302. The output LUT 306 may look-up function and control signals to be forwarded to the other components of the FMCA 300.

The LU 308 may perform various functions, such as, but not limited to, trigger logic functions, pre-adder controls, despreader code generation, and communicate with the ALU 310 to operate in parallel with it. In some embodiments, the ALU 310 may have internal parallelism. The ALU 310 may perform various arithmetic functions, such as, but not limited to, adding, multiplying, and other accumulation functions. The ALU 310 may also, according to some embodiments, perform enhanced FIT, despreading, filtering, and other operations. In one embodiment, the data paths of the ALU 310 may be reconfigured to perform these and additional functions or operations as may be required by other or new protocols.

The DRA 312 may be coupled one or more of the other components, as well as a command and configuration bus (CCB) 316. The CCB 316 may be coupled to a command and configuration mesh (CCM) (not shown). The DRA 312 may be coupled to a router to one or more networks of other MCAs or other components.

Figure 4:
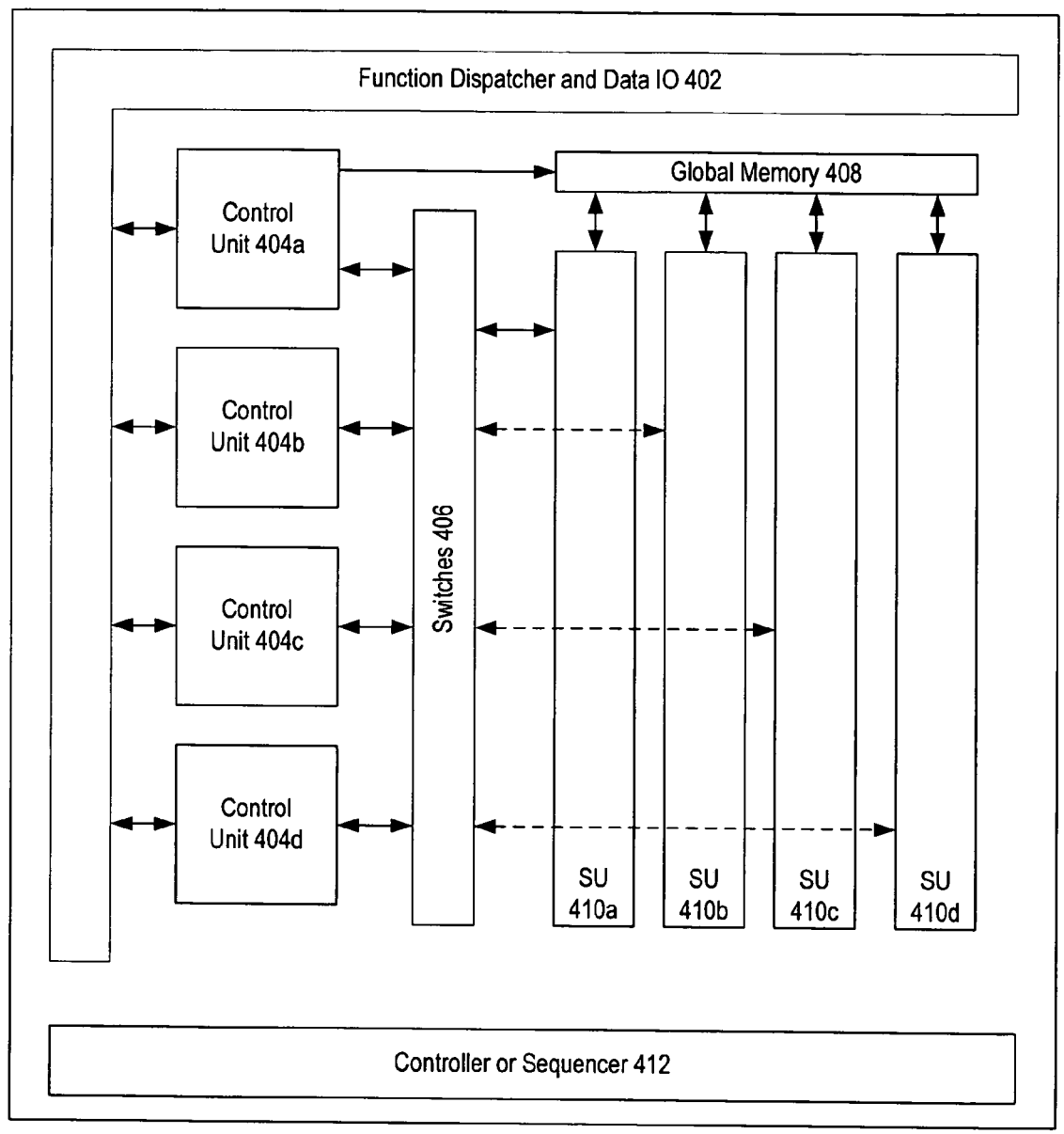
FIG. 4 illustrates a diagram of a general-purpose processing element, according to embodiments of the present invention.

With respect to FIG. 4, a diagram of a general-purpose processing element 400, according to embodiments of the present invention, is illustrated. The general purpose processing element, which may include one or more MCAs, may perform a variety of bit and symbol-oriented functions such as, but not limited to deinterleaving, and descrambling.

According to embodiments of the present invention, the general purpose MCA may include a function dispatcher and data input/output (IO) 402. The IO 402 may be coupled to one or more control units 404a-d. The control units 404 provide cyclic redundancy checking (CRC), scrambling, convolutional encoding, lower MAC (medium access code) state machine(s), packet address filtering, among other things as one of ordinary skill in the art would recognize based at least on the teachings described herein.

The CU 404 may be coupled to a general memory 408, and one or more switches 406. Each CU may include, but it not limited to, the following sub-units (not shown) a local memory unit, a multiplexer, a bit/field processing unit (or a look-up table), an address generation unit, or an arithmetic and logic unit. The general memory 408 may provide a general purpose shared memory for access of packet header parsing, look-up tables, interleaving, among other things as one of ordinary skill in the art would recognize based at least on the teachings described herein. The switches 406 may provide connectivity for the one or more CU 404 to the one or more special function units (SU) 410a-d.

In embodiments of the present invention, one or more logic units (not shown) may be implemented within the CU 404 and/or SU 410 to assist with symbol decoding, Euclidean distance calculations, combining operations, and the like, as one of ordinary skill in the relevant art(s) would recognize based at least on the teachings described herein.

According to embodiments of the present invention, the SU 410 may operate to provide fixed point processing, and may include specific multiplier/accumulator datapath units (not shown) within each SU.

In some embodiments of the present invention, a controller or sequencer 412 may be included to coordinate the data processing operations of the processing element 400.

Figure 5:
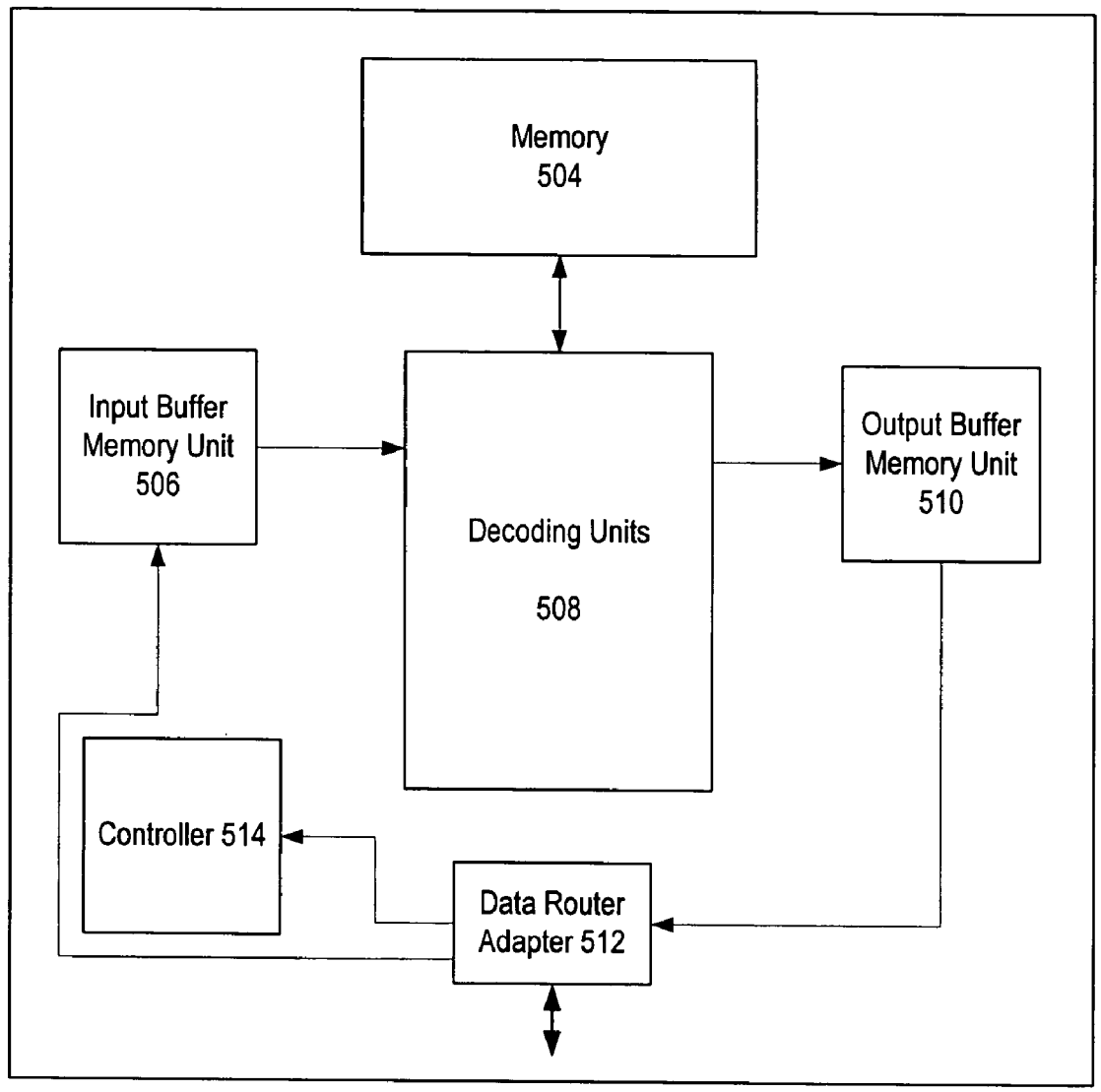
FIG. 5 illustrates a diagram of a decoding processing element, according to an embodiment of the present invention.

With respect to FIG. 5, a diagram of a decoding processing element 500, according to an embodiment of the present invention, is illustrated. The processing element (PE) 500 may include one or more MCA. In embodiments of the present invention, the MCA of PE 500 may include a data router adapter 512. The DRA 512 may be coupled to a controller 514, and an input buffer memory unit 506. In alternative embodiments (not shown), the DRA 512 may be coupled directly to one or more decoding units 508.

According to one or more embodiments of the present invention, the data/signals received by the DRA 512, which may be controlled by controller 514, are routed to the input buffer memory unit 506. The unit 506 may receive input data from the DRA 512. The unit 506 may also, in some embodiments of the present invention, perform turbo interleaving/deinterleaving.

In embodiments, of the present invention, a memory 504 coupled to one or more decoding units 508. According to embodiments of the present invention, the decoding units may perform, among other things, Viterbi, Trellis, and/or Turbo decoding operations. The decoding units 508 may provide numerous operational units, such as, but not limited to, carrier rotator units, delay units, rate matcher units, branch metric (BM) generators, distance calculators, BM combiners, BM memory units, BM state machines, to add, compare, select, match, code, decode, and/or synchronize in accordance with the various configurations stated above.

In some embodiments of the present invention, an output buffer memory unit 510 may receive output data from one or more decoding units 508 and may forward the output data to the DRA 512. The unit 510 may also, in some embodiments of the present invention, perform turbo interleaving/deinterleaving. In alternative embodiments, the unit 510 may not be present, and output data may be received directly at the DRA 512.

In one embodiment of the present invention, the PE 500 may receive input data at the DRA 512, processing the input data through the unit 506, one or more decoding units 508, and the unit 510, and output the output (decoded/encoded) data at the DRA 512 to other components of the present invention. The controller 514 may send/receive configuration packets to the DRA 512 for the other units of the PE 500, as one of ordinary skill in the art would recognize based at least on the teachings provided herein.

According to the operating environments discussed below, the operations of the present invention, according to the embodiments described above, may be implemented in a circuit designed to perform these operations. Such an apparatus may include programmable processing elements of one or more micro-coded accelerators.

The present invention (i.e., physical layer processing using flexible accelerators, the network of micro-coded accelerators or any part thereof) may be implemented using hardware, software or a combination thereof and may be implemented in one or more computing systems or other processing systems. In fact, in one embodiment, the invention may comprise one or more computer or computing systems capable of carrying out the functionality described herein.

Figure 6:
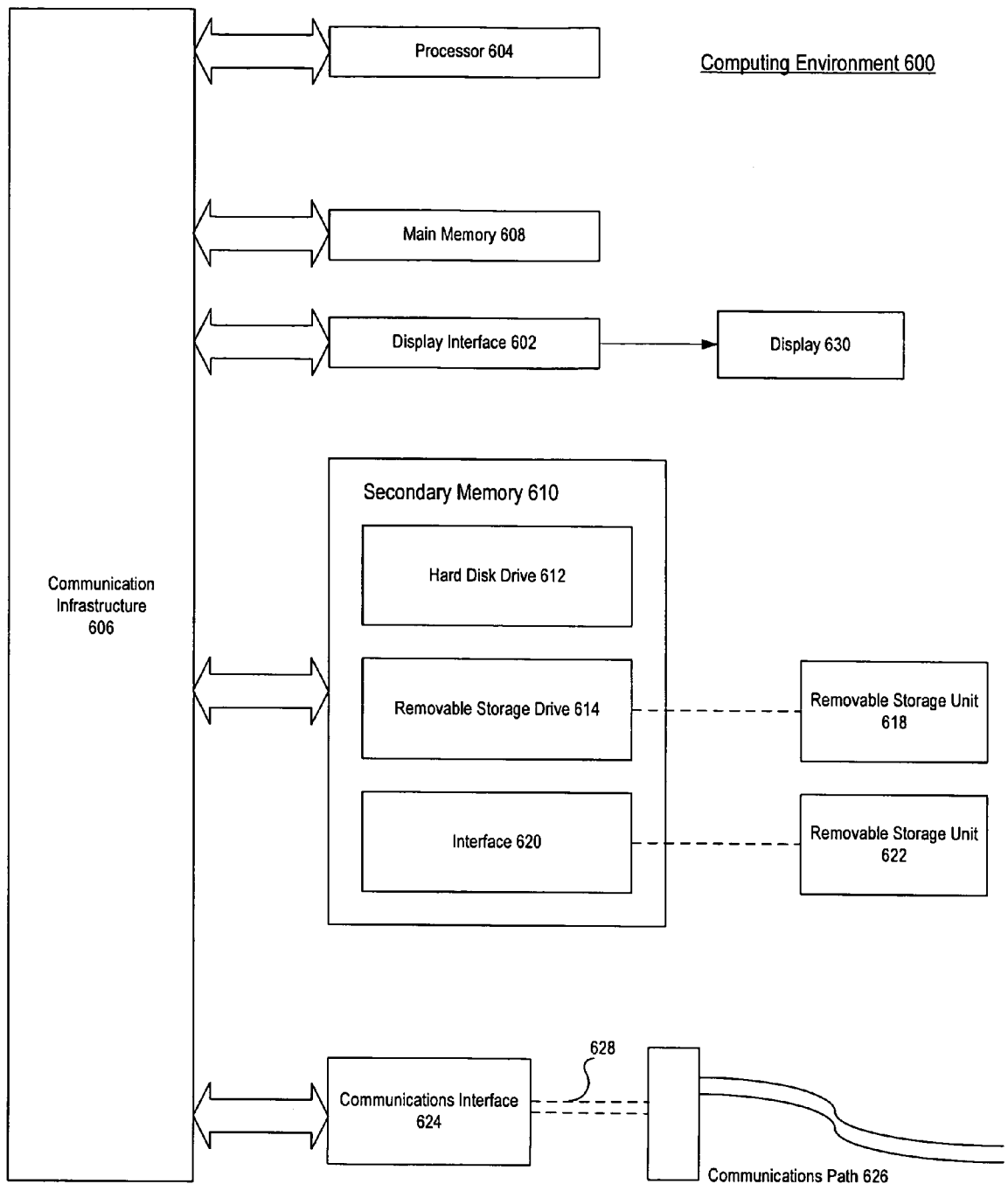
FIG. 6 illustrates a computing environment, which may be implemented in one or more devices, such as, but not limited to communications devices, according to embodiments of the present invention.

Such computer systems may be implemented in a personal computer (PC), personal digital assistant (PDA), cellular or mobile telephone, pager, kiosk, or some combination of these devices. An example of a computing environment 600 is shown in FIG. 6. The computing environment 600 may include one or more processors, such as processor 604. The processor 604 may be coupled to a communication infrastructure 606 (e.g., a communications bus, cross over bar, or network). The processing elements described above may be implemented with the environment 600 and may be coupled, at least electrically, to the environment 600.

Various software embodiments are described in terms of this exemplary computer system. After reading this description, it will become apparent to a person skilled in the relevant art(s) how to implement the invention using other computer systems and/or computer architectures to operate the processing elements of the present invention.

Computing environment 600 may include a display interface 602 that may forward graphics, text, and other data from the communication infrastructure 606 (or from a frame buffer not shown) for display on the display unit 630.

Computing environment 600 may also include a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc, but which is not limited thereto. The removable storage drive 614 may read from and/or write to a removable storage unit 618 in a well known manner. Removable storage unit 618, may represent a floppy disk, magnetic tape, optical disk, etc. which may be read by and written to by removable storage drive 614. As will be appreciated, the removable storage unit 618 may include a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include, but are not limited to, a program cartridge and cartridge interface (such as that found in video game devices), a removable memory chip (such as an EPROM, or PROM) and associated socket, and/or other removable storage units 622 and interfaces 620 that may allow software and data to be transferred from the removable storage unit 622 to computing environment 600.

Computing environment 600 may also include a communications interface 624. Communications interface 624 may allow software and data to be transferred between computer system 600 and external devices. Examples of communications interface 624 may include, but are not limited to, a modem, a network interface (such as an Ethernet card), a communications port, a PCMCIA slot and card, and/or a transceiver (or receiver/transmitter combination) configured to operate according to one or more protocols, etc. Software and data transferred via communications interface 624 are in the form of signals 628 which may be, for example, electronic, electromagnetic, optical or other signals capable of being received by communications interface 624. These signals 628 may be provided to communications interface 624 via a communications path (i.e., channel) 626. This channel 626 may carry signals 628 and may be implemented using wire or cable, fiber optics, a phone line, a cellular phone link, an radio frequency (RF) link and/or other communications channels.

In this document, the term "machine readable medium". is used to generally refer to media such as, but not limited to, removable storage drive 614, a hard disk installed in hard disk drive 612, and signals 628. These types of media are means for providing instructions to computing environment 600.

Computer programs (also called computer control logic) may be stored in main memory 608 and/or secondary memory 610. Computer programs may also be received via communications interface 624. Such computer programs, when executed, enable the computing environment 600 to perform the features of the present invention as discussed herein. In particular, the computer programs, when executed, may enable the processor 604 to perform the present invention in accordance with the above-described embodiments. Accordingly, such computer programs represent controllers of the computing environment 600.

In an embodiment where the invention may be implemented using software, the software may be stored in a computer program product and loaded into computing environment 600 using, for example, removable storage drive 614, hard drive 612 or communications interface 624. The control logic (software), when executed by the processor 604, causes the processor 604 to perform the functions of the invention as described herein.

In another embodiment, aspects of the computing environment, which receive the signal, prior to or after the PHY layer processing of the present invention is implemented primarily in hardware using in part(s), for example, hardware components such as micro-coded accelerators, digital signal processors, or application specific integrated circuits (ASICs). Implementation of the hardware state machine so as to perform the functions described herein will be apparent to persons skilled in the relevant art(s). As discussed above, the invention may be implemented using any combination of hardware, firmware and software.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above described exemplary embodiments, but should be defined only in accordance with the following claims and their equivalents.

What is claimed is:

1. A circuit, comprising:
   a filter processing element reconfigurable to process a signal by use of at least one process selected from a group comprising of digital filtering, adaptive equalization, resampling, despreading, and fast-Fourier transforming;
   at least one decoding processing element to decode and correct errors in said signal;
   a general purpose processing element to process said signal by use of at least one code process selected from a reconfiguration group comprising of deinterleaving, descrambling, cyclic redundancy checking, convolutional encoding, Reed-Solomon encoding, turbo encoding, and Trellis encoding; and
   one or more control units to direct the operations of the processing elements according to a first set of protocols,
   wherein the processing elements are coupled in a network.

2. The circuit of claim 1, wherein said at least one decoding processing element includes at least one decode process selected from a reconfiguration group comprising of a first forward error correction decoding, Reed-Solomon forward error correction decoding, turbo decoding, Trellis decoding, and Viterbi decoding.

3. The circuit of claim 1, wherein said one or more control units are implemented in said filter processing element.

4. The circuit of claim 1, wherein said one or more control units are implemented in said at least one decoding processing element or said general purpose processing element.

5. The circuit of claim 1, wherein said network further includes one or more routers.

6. The circuit of claim 1, wherein said one or more control units reconfigure the processing elements to operate according to a second set of protocols.

7. The circuit of claim 6, wherein either of said first set and said second set of protocols include parameters for operation within a network selected from a group comprising a wireless network, a local area network, a wide area network, and an optical network.

8. The circuit of claim 1, further comprising:
   a communications interface to couple said processing elements to said network; and
   a supplemental processing element to transmit said signal on a communications path coupled to said network via said communications interface, wherein said supplemental processing element receives said signal after processing by said processing elements.

9. The circuit of claim 8, wherein said communications interface includes at least one data router adapter.

10. A method, comprising:
    determining operations of one or more reconfigurable processing elements according to a first set of protocols;
    receiving a signal from a network at a reconfigurable filter processing element;
    processing said signal at said filter processing element by use of at least one process selected from a reconfiguration group comprising of digital filtering, adaptive equalization, resampling, despreading, and fast-Fourier transforming;
    decoding said signal to decode and correct errors in said signal by at least one decoding processing element; and
    processing said signal by a general purpose processing element by use of at least one code process selected from a reconfiguration group comprising of deinterleaving, descrambling, cyclic redundancy checking, convolutional encoding, Reed-Solomon encoding, turbo encoding, and Trellis encoding.

11. The method of claim 10, wherein said at least one decoding processing element is reconfigurable to perform at least one decode process selected from a reconfiguration group comprising of a first forward error correction decoding, Reed-Salomon forward error correction decoding, turbo decoding, Trellis decoding, and Viterbi decoding.

12. The method of claim 10, wherein said one or more control units are implemented in said filter processing element.

13. The method of claim 10, wherein said one or more control units are implemented in said at least one decoding processing element or said general purpose processing element.

14. The method of claim 10, wherein said network further includes one or more routers.

15. The method of claim 10, wherein said one or more control units reconfigure the processing elements to operate according to a second set of protocols.

16. The method of claim 15, wherein either of said first set and said second set of protocols include parameters for operation within a network selected from a group comprising of a wired network, a wireless network, a local area network, a wide area network, and an optical network.

17. The method of claim 10, further comprising:
transmitting said signal by a supplemental processing element on a communications path after said signal is processed by said processing elements,
wherein a communications interface couples said processing elements to said network, and wherein said network couples said supplemental processing element to said communications interface.

18. The method of claim 17, wherein said communications interface includes at least one data router adapter.

19. A computer-readable medium that provides instructions, which when executed by a processing element, cause the processing element to perform operations comprising micro-coded accelerator based operations of:
receiving a signal from a network at a reconfigurable filter processing element;
processing said signal at said filter processing element by use of at least one process selected from a reconfiguration group comprising of digital filtering, adaptive equalization, resampling, despreading, and fast-Fourier transforming;
decoding said signal to decode and correct errors in said signal by at least one decoding processing element; and
processing said signal by a general purpose processing element by use of at least one code process selected from a reconfiguration group comprising of deinterleaving, descrambling, cyclic redundancy checking, convolutional encoding, Reed-Solomon encoding, turbo encoding, and Trellis encoding.

20. The computer-readable medium of claim 19, wherein said at least one decoding processing element is reconfigurable to perform at least one decode process selected from a reconfiguration group comprising of a first forward error correction decoding, Reed-Salomon forward error correction decoding, turbo decoding, Trellis decoding, and Viterbi decoding.

21. The computer-readable medium of claim 19, wherein said one or more control units are implemented in said filter processing element.

22. The computer-readable medium of claim 19, wherein said one or more control units are implemented in said at least one decoding processing element or said general purpose processing element.

23. The computer-readable medium of claim 19, wherein said network further includes one or more routers.

24. The computer-readable medium of claim 19, wherein said one or more control units reconfigure the processing elements to operate according to a second set of protocols.

25. The computer-readable medium of claim 24, wherein either of said first set and said second set of protocols include parameters for operation within a network selected from a group comprising of a wired network, a wireless network, a local area network, a wide area network, and an optical network.

26. The machine computer-readable medium according to claim 19, providing further instructions, which when executed by a processing element, cause the processing element to perform a further operation of:
transmitting said signal by a supplemental processing element on a communications path after said signal is processed by said processing elements,
wherein a communications interface couples said processing elements to said network, and wherein said network couples said supplemental processing element to said communications interface.

27. The computer-readable medium of claim 26, wherein said communications interface includes at least one data router adapter.

* * * * *